UNITED STATES PATENT OFFICE.

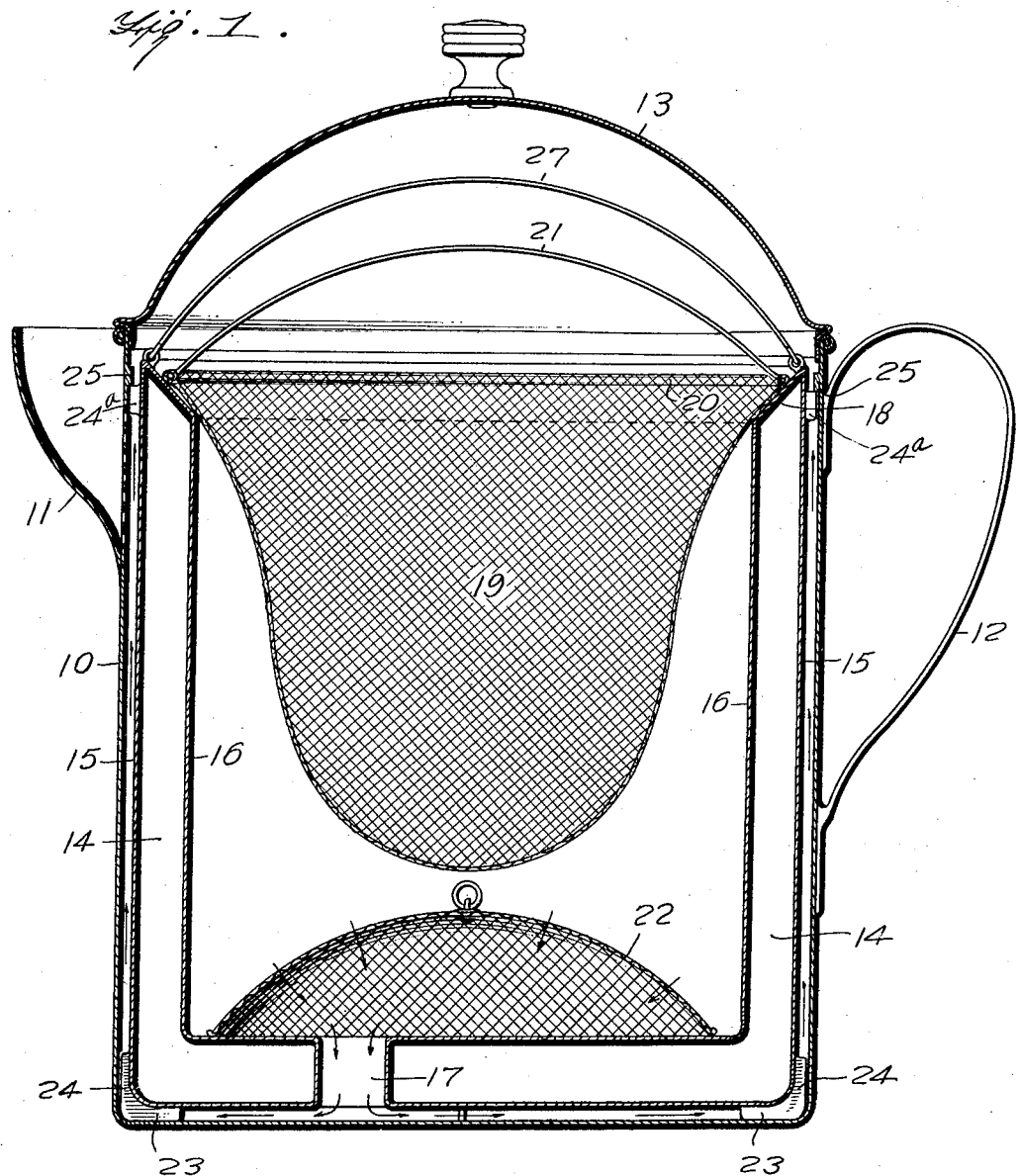

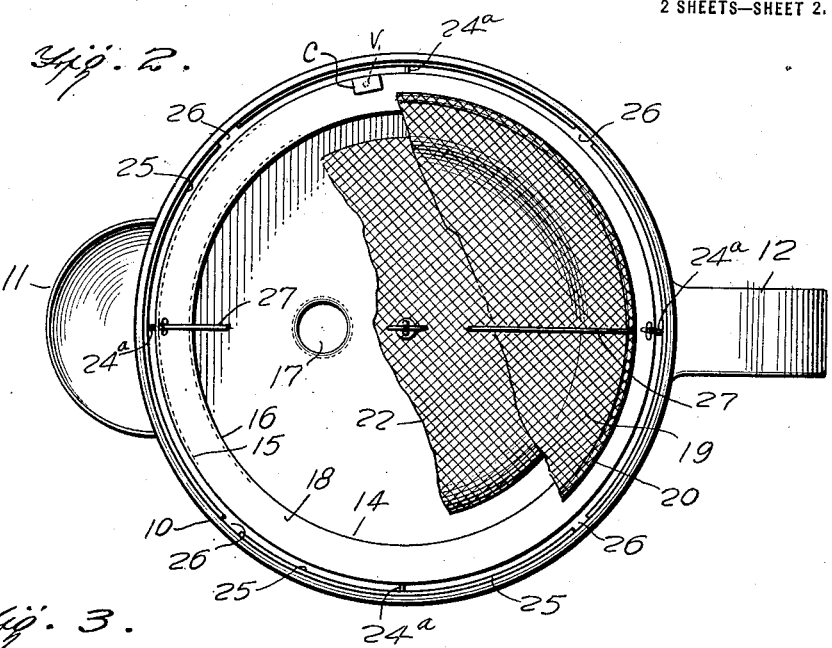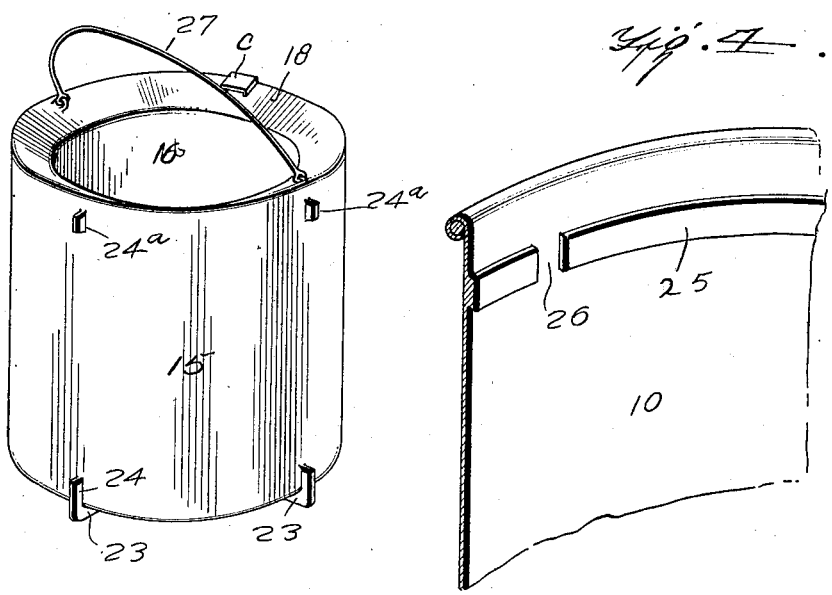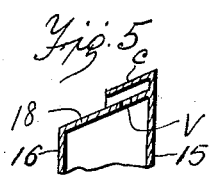

JAMES A. HOLMAN, OF SALIDA, COLORADO.

COFFEE-URN.

1,385,453. Specification of Letters Patent. Patented July 26, 1921.

Application filed August 9, 1920. Serial No. 402,174.

*To all whom it may concern:*

Be it known that I, JAMES A. HOLMAN, a citizen of the United States, residing at Salida, in the county of Chaffee and State of Colorado, have invented certain new and useful Improvements in Coffee-Urns, of which the following is a specification, reference being had to the accompanying drawings.

This invention relates to coffee urns and has for an important object the provision of an urn wherein circulation of the water through the coffee is obtained in a minimum of time and is maintained continuously as long as heat is applied thereto.

A further object of the invention is to provide a device of the above character which may be readily and thoroughly cleaned.

A further object of the invention is to provide a device of this character comprising an outer receptacle and an inner receptacle arranged within the outer receptacle and an inner receptacle arranged within the outer receptacle embodying spaced side walls, affording therebetween a dead air space whereby the space intermediate the outer and inner receptacles is insulated from the main body of water which will be contained within the inner receptacle and may accordingly be rapidly brought to the boiling point.

Further objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a vertical sectional view taken through a coffee urn constructed in accordance with my invention.

Fig. 2 is a top plan view of my coffee urn, the cover being removed and portions broken away for the purpose of illustration.

Fig. 3 is a perspective view with the inner receptacle removed.

Fig. 4 is a fragmentary perspective showing the retaining lug formed upon the inner surface of the outer receptacle; and Fig. 5 is a sectional view showing the formation of the vent and vent cap of the inner receptacle.

Referring now more particularly to the drawings, the numeral 10 indicates a suitable receptacle preferably cylindrical in form and provided with a pouring spout 11 and a handle 12 by means of which it may be manipulated. The receptacle is provided with an open top which is closed by the lid 13.

An inner receptacle 14 is provided, comprising an outer cylindrical member 15 and an inner cylindrical member 16, the inner cylindrical member being of less diameter than the outer cylindrical member. The bottoms of the inner and outer cylindrical members 15 and 16 are held in spaced relation by the tube 17 which has its ends secured to said bottom and opening therethrough. The upper end of the wall of the inner cylindrical member 16 terminates short of the upper end of the wall of the member 15 and is connected to the upper end of the wall thereof by an inclined wall 18. A vent V is formed in the inclined wall 18 adjacent the top thereof, a cover or cap C being provided for the vent. This vent releases the pressure caused by the heating of the air between the walls of the cylindrical members 15 and 16 and the cap C serves to prevent the entrance of water at the vent.

A receptacle 19, for holding coffee, is provided having at its upper end an outwardly inclined rim 20 which engages the inclined portion 18 of the inner receptacle 14 supporting the receptacle 19. This receptacle 19 is provided with a cross wire or bail 21 by which it may be readily removed from the receptacle 14. Arranged upon the bottom of the inner receptacle 16 is an inverted concavo-convex strainer 22 covering the aperture communicating with the outlet pipe 17. This strainer is of some suitable fine mesh material as is the receptacle 19 and is provided with a bail or ring by means of which it may be removed from the inner receptacle 14.

The receptacle 14 is provided upon the under surface of the bottom thereof with spaced lugs 23 adapted to contact with the bottom of the receptacle 10 and accordingly hold the bottoms of the inner and outer receptacles 10 and 14 in spaced relation. The receptacle 14 is likewise provided at its lower end upon its outer side walls with a series of spaced lugs 24 preferably formed by continuation of the lugs 23. Adjacent its upper end the receptacle 14 is provided with a further series of lugs 24$^a$. The receptacle 10 is provided upon the interior thereof with a lug 25 extending therearound and provided at intervals spaced a distance corresponding to the space between the lugs 24 24ª of the receptacle 14 with openings 26. The receptacle 14 is provided with a bail 27 by means of which it may be manipulated.

In assembling my coffee pot the inner receptacle is placed in position by alining the lugs 24 24ª thereof with the apertures 26 of the lugs 25 of the outer receptacle 10. The strainer 22 is then placed in position and likewise the receptacle 19 which is filled with the coffee or other material which is used. Water is then poured through the material in the receptacle 19 and the pot placed upon the fire. It will be obvious that heat applied to the bottom will cause the water in the narrow space between the bottom of the receptacle 14 and the bottom of the receptacle 10 to boil rapidly and to pass upwardly through the space formed by the spaced lugs 24 and 24ª. It will be noted that the lugs 24ª engage beneath the lower surface lug 25 of the receptacle 10, thereby preventing upward displacement of the receptacle 14 by the expansive force of the boiling water. The water passes upwardly over the upper edge of the receptacle 14 and downwardly through the material in the receptacle 19. It will be obvious that when the entire contents of the pot come to a boil the circulation will be extremely rapid, and the top 13 is accordingly appropriately curved upon its upper surface in order that it may direct the water, impinging thereagainst, downwardly into the receptacle 19.

As many changes are possible in the shape, size and general arrangement of the various parts herein shown, I do not limit myself to the specific structure hereinbefore set forth, but may make any such changes without departing from the spirit of the invention or the scope of the subjoined claims.

Having now described my invention, what I claim is:

1. In a coffee urn, outer and inner receptacles, said inner receptacle being provided with spaced walls affording therebetween a dead air space, spaced lugs extending intermediate the sides and bottom of said inner receptacle and said outer receptacle to afford therebetween circulation passages, said inner receptacle being provided in the bottom thereof with an outlet connecting the interior thereof with said circulation passages, said lugs being secured to said inner receptacle and a lug secured to said outer receptacle and abutting the upper surface of one of the lugs secured to said inner receptacle, whereby vertical displacement of said inner receptacle is prevented.

2. In a coffee urn, outer and inner receptacles, said inner receptacle being provided with spaced walls affording therebetween a dead air space, spaced lugs secured to said inner receptacle upon the sides and bottom thereof whereby said inner receptacle is held in spaced relation to said outer receptacle, an outlet formed in the bottom of said inner receptacle and connecting the interior thereof with the space intermediate said receptacles, the lugs upon the sides of said inner receptacle being arranged in circumferentially spaced series, a lug extending inwardly from the inner wall of said outer receptacle and provided with openings spaced apart a distance corresponding to the distance between the series of lugs on said outer receptacle, said last named lug when the receptacles are assembled engaging with its under face the upper face of the uppermost lug of each of said series.

3. In a coffee urn an outer receptacle, an inner receptacle arranged within said outer receptacle and having its outer wall spaced from the inner wall thereof, said inner receptacle being provided with spaced walls affording therebetween a dead air space, the inner wall of said inner receptacle being of less height than the outer wall thereof, and being connected thereto by an inclined wall, a receptacle adapted to be arranged within said inner receptacle and provided with an outstanding annular rim adapted to engage said inclined wall, an outlet formed in the bottom of said inner receptacle connecting the interior thereof with the space intermediate said receptacles, and a concavo-convex strainer disposed within said inner receptacle and covering the outlet thereof.

In testimony whereof I hereunto affix my signature.

JAMES A. HOLMAN.